H. MEYER-DELIUS.
COMPENSATING WINDING FOR POLYPHASE COMMUTATOR MACHINES WITH DRUM ARMATURES.
APPLICATION FILED MAR. 24, 1910.

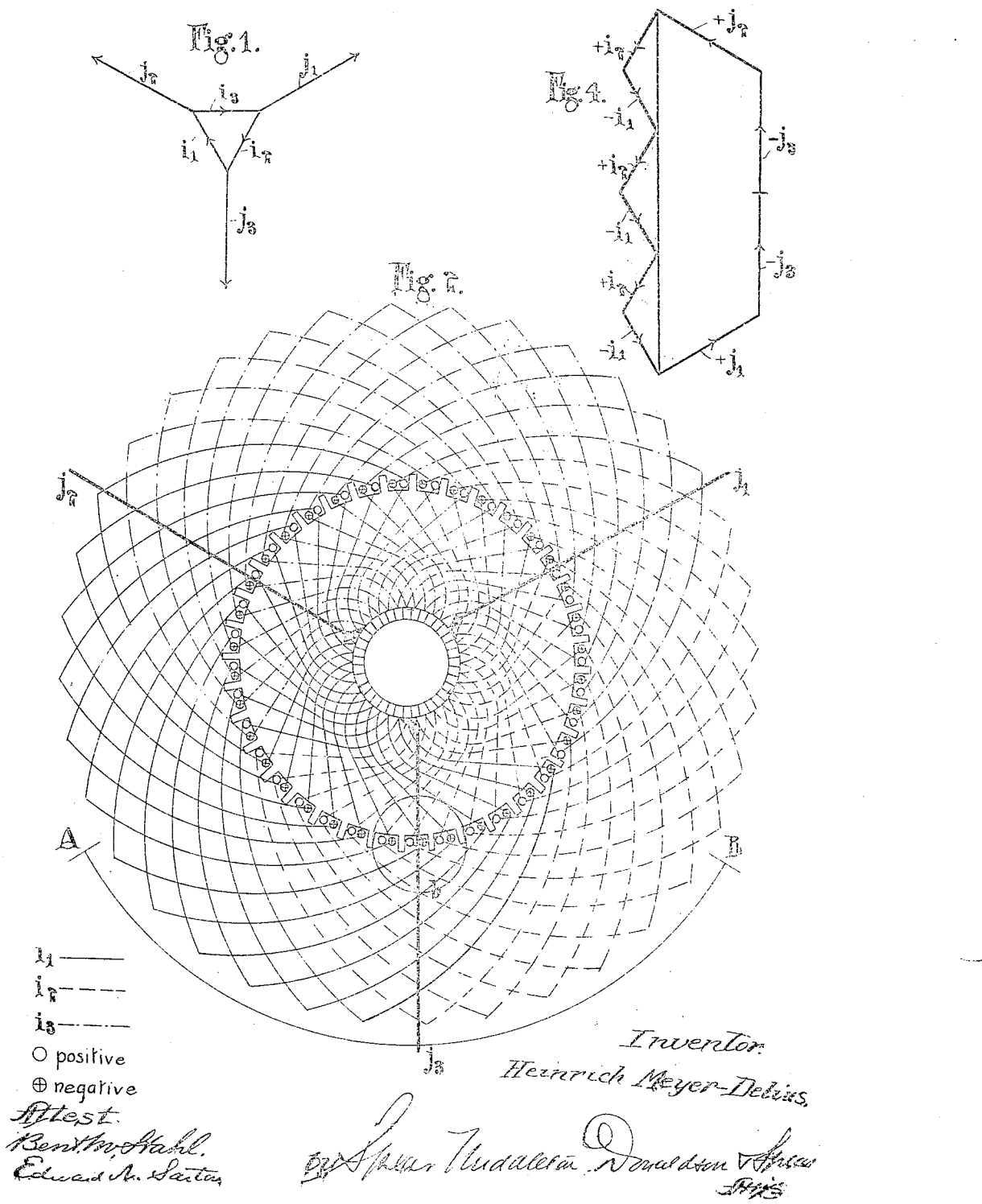

1,118,433.

Patented Nov. 24, 1914.
3 SHEETS—SHEET 3.

UNITED STATES PATENT OFFICE.

HEINRICH MEYER-DELIUS, OF BADEN, SWITZERLAND, ASSIGNOR, BY MESNE ASSIGNMENTS, TO GENERAL ELECTRIC COMPANY, A CORPORATION OF NEW YORK.

COMPENSATING WINDING FOR POLYPHASE COMMUTATOR-MACHINES WITH DRUM-ARMATURES.

1,118,433.

Specification of Letters Patent.

Patented Nov. 24, 1914.

Application filed March 24, 1910. Serial No. 551,335.

*To all whom it may concern:*

Be it known that I, HEINRICH MEYER-DELIUS, a subject of the Emperor of Germany, and residing at Hotel Bélvédère, Baden, Switzerland, have invented a certain new and useful Compensating Winding for Polyphase Commutator-Machines with Drum-Armatures, of which the following is a specification.

This invention relates to the compensation of polyphase commutator machines with drum armatures by means of a compensating winding.

In polyphase commutator motors having drum armatures the compensating winding arranged on the stator must be composed of sections carrying current of different phases. The endeavor has hitherto been made to realize this object by using a kind of coil winding or concentrated windings. Such coil windings have the disadvantage that they are difficult to manufacture as in polyphase arrangements they possess many crossings.

The object of the present invention is to obtain an improved winding for the purpose referred to above.

In order properly to compensate the ampere bars or conductors of the drum armature (arranged in delta connection) by the brush currents (with a drum winding) in the stator, the stator winding for each division or portion of the stator must include conductors carrying currents of each phase.

In accordance with my invention, I provide the commutator machine with a compensating winding which comprises a two-part drum winding which is opened up at certain points and is then so connected that each brush current flows in series through one section of one part of said winding and then through a section of the other part of said winding in the reverse direction and so that every part of the stator has adjacent windings receiving current from three different phases or each of the phases employed. In the specification, when I speak of current from all the different phases, I mean that every part of the stator shall have adjacent windings which are traversed by currents displaced from each other by 120 electrical degrees.

The invention also consists in the improved compensating arrangements described herein and more specifically pointed out in the claims appended hereto.

Figure 3:
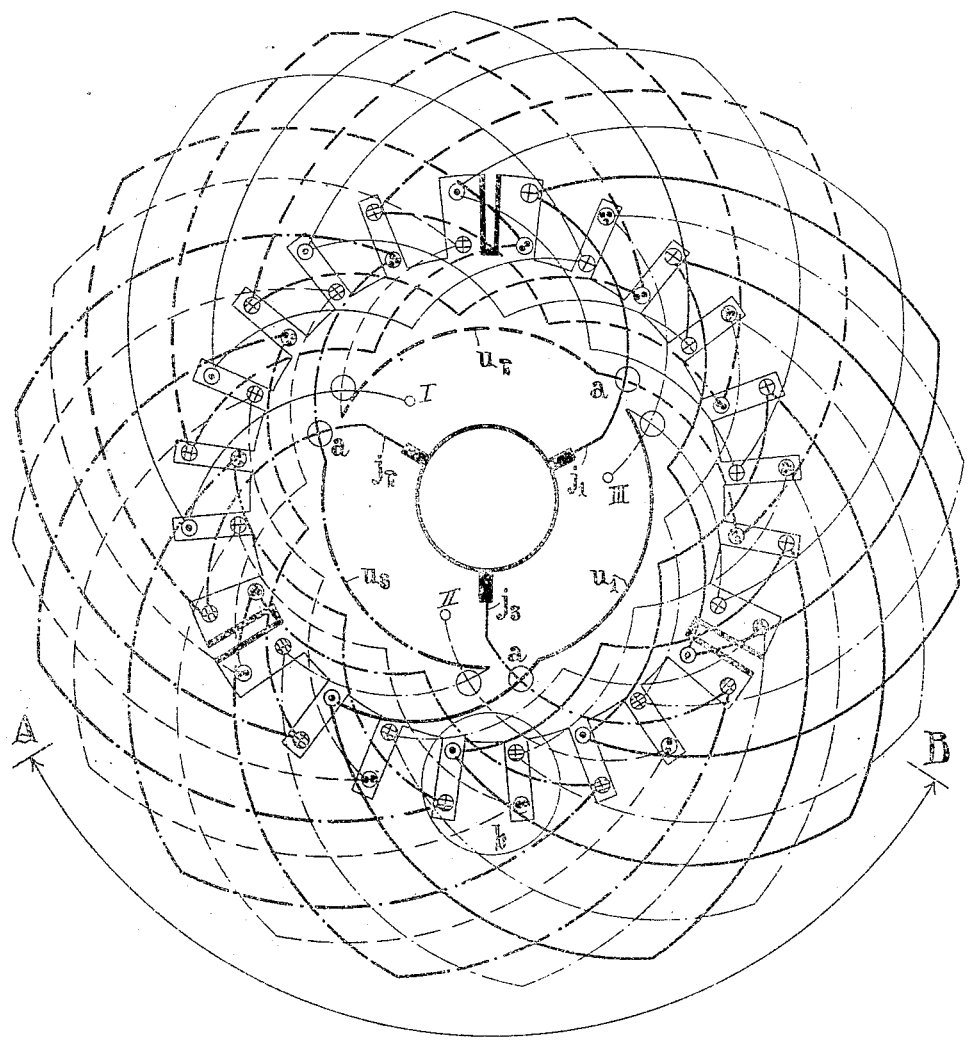
Figure 5:
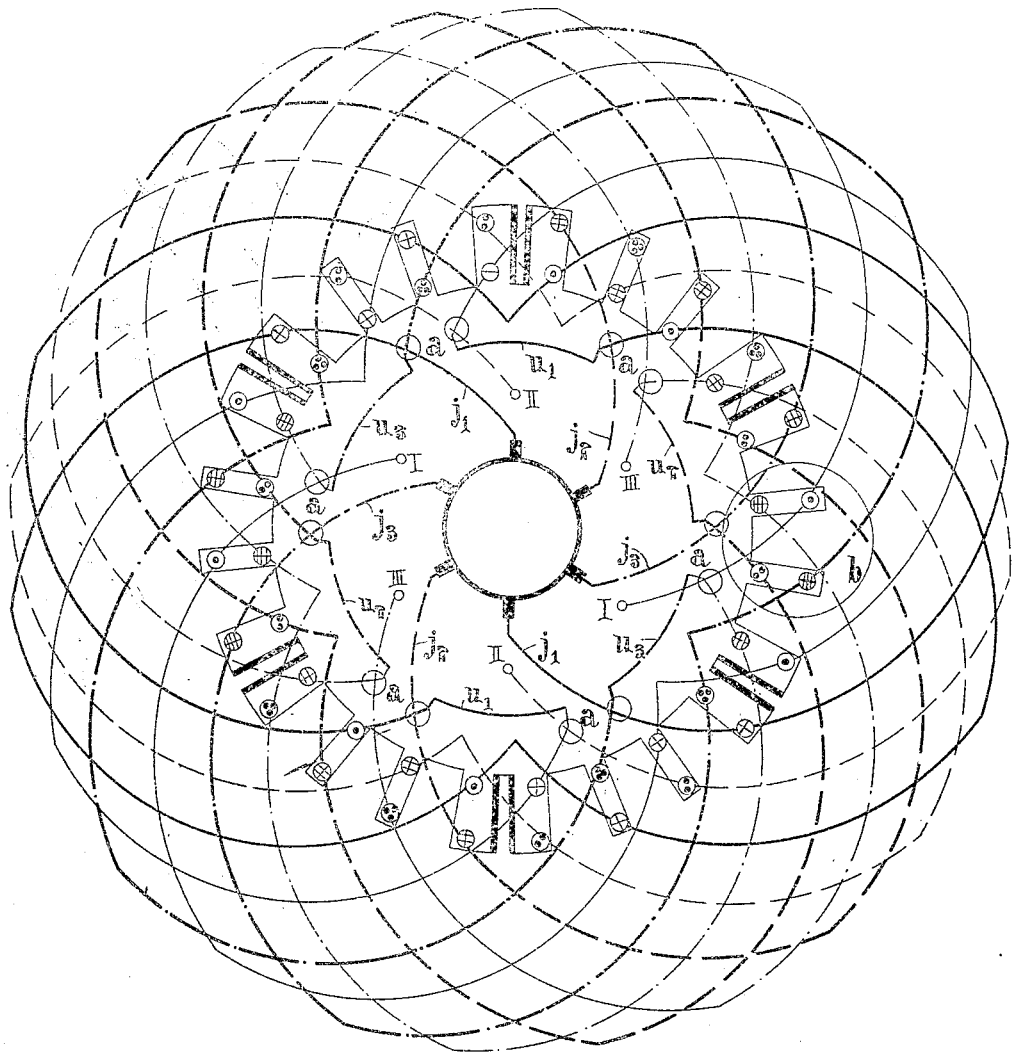

Referring now to the accompanying drawings, Figure 1 diagrammatically represents the current vectors. Fig. 2 is a diagram of connections for a drum armature wound for three-phase current according to one form of the present invention. Fig. 3 shows a compensating arrangement for the armature of Fig. 2. Fig. 4 is a vector diagram showing the relation between the armature and compensating currents. Fig. 5 represents a modified manner of carrying the invention into effect applied to a six pole machine with a wave winding.

In Fig. 1, $i_1$, $i_2$, $i_3$, indicate the vectors of the three currents which flow in the three armature circuits. The vectors $j_1$, $j_2$, $j_3$, indicate the brush currents which after leaving the brushes, flow through the various circuits of the compensating winding.

In Fig. 2 the conductors momentarily carrying the armature current $i_1$ are indicated by full lines (connecting the ends of the armature bars) while those carrying the armature current $i_2$ are indicated by dash lines and those carrying armature current $i_3$ by chain lines. The blank circles (which illustrate the armature bars or conductors) indicate that the vectors of the armature currents in Fig. 1 are to be counted as positive, while the circles marked with crosses are to indicate that the vectors of the armature currents are to be considered as negative. Such a convention is used because the currents may flow both from rear to front as well as from front to rear, which corresponds to a shifting of the vector diagram through 180°.

Fig. 3 shows a compensating winding connected to the mains at terminals I, II and III which is capable of compensating the armature shown in Fig. 2. The armature brush currents $j_1$, $j_2$, $j_3$ flow through the compensating winding shown in Fig. 3. The armature bars or conductors are marked in a special manner the meaning of which markings is shown on the drawing and commutation poles are indicated in heavy lines.

It can easily be ascertained from Figs. 1 to 4 that the stator field shown in Fig. 3 compensates the armature field shown in Fig. 2. Twenty-four bars or conductors are arranged in the part shown by the line A B of the rotor (Fig. 2) while sixteen bars are arranged in the corresponding compensated stator portion shown by the line A B (Fig. 3) that is to say, every six bars or conductors of the rotor have to be compensated by four bars or conductors of the stator (24:16=6:4). The bars or conductors which compensate each other in Figs. 2 and 3 are indicated in these figures by the circles $b$ which are drawn around them.

If Figs. 2 and 3 be compared with the diagram shown in Fig. 1, and if the vectors of the currents flowing in the six and four circuits of the rotor and stator respectively be combined, the diagram shown in Fig. 4 will result. From this it will be seen that the vectorial sum of the four vectors of the stator currents $j$ balances the six vectors of the rotor currents $i$ that is to say the resultant of the currents $i$ is equal to the resultant of the currents $j$ and is of opposite direction.

After having proved that the stator winding shown in Fig. 3 results in a correct compensation it remains to be shown how such a winding can be obtained. From Fig. 3 it will be seen that the compensating winding is a multipart winding here shown as comprising two parallel strands or parts, one indicated by thick lines and the other by thin lines. The parts of this winding are shown as wound in alternate slots, but it is only essential that the active portions of one part be always adjacent those of the other parts, and if desired the slots might be combined. The two strands would form two perfectly independent closed or complete windings, made up of coils of equal pitch, if they were not cut open anywhere which can easily be appreciated if it is imagined that the windings are connected at the crossing points where the circles $a$ are shown. These two windings are however cut open at the points indicated by these circles $a$ and the sections thus produced are so connected by the connectors $u_1$, $u_2$, and $u_3$, that each brush current flows in series through one section of one strand and then through a section of the other strand. Each of these sections extends over approximately 240 electrical degrees and the sections of each part of the winding are displaced, with relation to each other, approximately 120 electrical degrees around the inner circumference of the stator. The result is that the adjacent conductors of each part of the winding,—that is to say those conductors located in the same slot, in the arrangement here shown, carry currents having a phase difference of 120 degrees. Similarly the sections of the other part of the winding extend over approximately 240 degrees and are displaced 120 degrees with relation to each other. The relation of the two parts is such that the associated sections which carry current of the same phase are displaced approximately 120 degrees. It will also be seen that, of the conductors in adjacent slots, two carry current of the same phase, while the other two carry currents having a phase difference of 120 degrees from each other and from the first. Thus the desired result has been obtained. The stator winding can be constructed as a loop or multiple circuit winding or as a wave winding (two circuit-winding).

It will be understood that, in the specification and claims, wherever I use the term "degrees", I mean electrical degrees in distinction to space degrees.

In the form of the invention illustrated in Fig. 5 a stator compensating winding is provided for a six-pole machine the winding being a wave winding. In this figure letters corresponding to those used in Fig. 3 represent like parts, two parallel winding strands are used each of which forms a six-pole closed wave winding as will be seen by inspection of the drawings. These strands are indicated as before by lines of different thicknesses as explained in the table below Fig. 3. At the points $a$ the two strands are cut open and arranged in series by means of the connections $u_1$ $u_2$ $u_3$. The ends of the windings which come to the terminals I, II and III are there connected to the mains and the brush currents $j_1$, $j_2$ and $j_3$ (see also Figs. 1 and 2) flow through windings in the directions indicated in the table referred to above so that a correct compensation is obtained as in Fig. 3. If the stator compensating winding shown in Fig. 5 be utilized with a drum armature rotor winding as shown in Fig. 2, the four conductors in the circle shown in Fig. 5 will compensate the six conductors shown in a circle in Fig. 2. It will be understood that this method may be extended in an analogous manner to any desired number of poles.

What I claim as new and desire to secure by Letters Patent of the United States, is:—

1. In a three phase alternating current commutator machine, an evenly distributed compensating winding consisting of a plurality of parts disposed as parallel strands, each part being cut into sections, one section of one part being connected in series with a section of the other part and with a brush so that the brush current passes through the two sections in opposite directions.

2. In a three-phase alternating current commutator machine, an evenly distributed compensating winding consisting of two similar parts made up of coils of equal pitch, each part being cut into sections, one section of one part being connected in series with a section of the other part and with a brush, so that the brush current passes through the two sections in opposite directions.

3. In a three-phase alternating current commutator machine, the combination with a rotor provided with a drum winding, of a stator provided with an evenly distributed compensating winding, comprising two complete windings wound in opposite directions, each of said windings being cut into sections, each section extending over approximately 240 degrees, and displaced from each of the other sections of the same winding approximately 120 degrees, and connected in series with a section of the other winding which is displaced therefrom approximately 120 degrees.

4. In a three phase alternating current commutator machine, the combination with a rotor provided with a drum winding, of a stator also provided with a drum winding, said stator winding being divided into sections and comprising two sections for each phase, each section being wound over 240 degrees, and the two sections being relatively displaced by approximately 120 degrees and wound in reverse directions.

5. In a three-phase alternating current commutator machine, the combination with a rotor provided with a drum winding, of a stator provided with an evenly distributed compensating winding, comprising two complete windings, each made up of coils of equal pitch, these windings being wound in opposite directions and each being cut into three sections, each section of one winding being connected in series with a section of the other winding between a brush and a machine terminal, and those sections carrying current of the same phase being displaced approximately 120 degrees.

6. In a three-phase alternating current commutator machine, the combination with a rotor provided with a drum winding of a stator provided with an evenly distributed winding comprising windings arranged in three distinct circuits between a brush and a machine terminal, the winding in each circuit being made up of two sections wound in opposite directions, each section consisting of equal pitch coils having a pitch of approximately 120 degrees.

In testimony whereof, I affix my signature in presence of two witnesses.

HEINRICH MEYER-DELIUS.

Witnesses:
 HERRMANN FRANK,
 CARL GUBLER.